Figure 1:
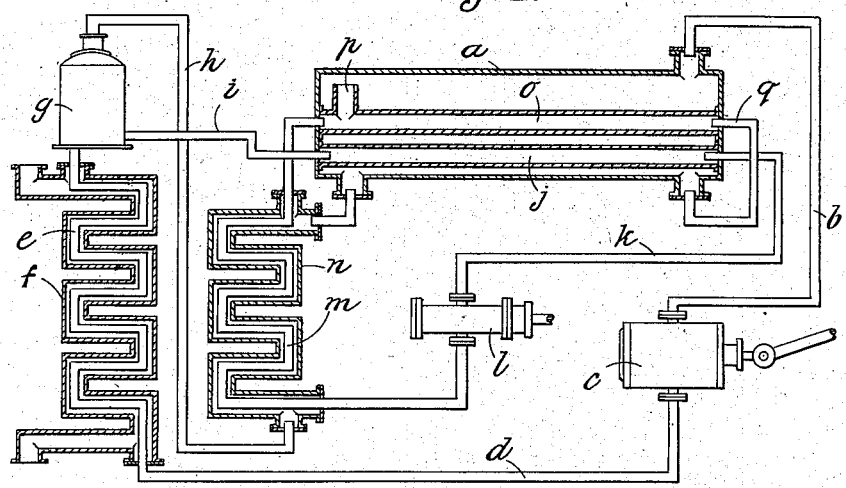

C. H. BEADLE.
METHOD OF AND MEANS FOR TAKING ENERGY FROM A SOURCE OF NATURAL OR WASTE HEAT.
APPLICATION FILED SEPT. 3, 1915.

1,171,305.

Patented Feb. 8, 1916.

Witnesses:
M. E. McDade
C. D. Kesler

Inventor
Charles H. Beadle
by
James L. Norris
Attorney

UNITED STATES PATENT OFFICE.

CHARLES HYDE BEADLE, OF SOUTHAMPTON, ENGLAND.

METHOD OF AND MEANS FOR TAKING ENERGY FROM A SOURCE OF NATURAL OR WASTE HEAT.

1,171,305. Specification of Letters Patent. Patented Feb. 8, 1916.

Application filed September 3, 1915. Serial No. 48,853.

*To all whom it may concern:*

Be it known that I, CHARLES HYDE BEADLE, a subject of the King of Great Britain, residing at Southampton, Hampshire, England, have invented a new and useful Improved Method of and Means for Taking Energy from a Source of Natural or Waste Heat Into a Closed Cycle of Thermal Operations, of which the following is a specification.

This invention relates to a closed fluid cycle and to a method of and means for operating the same whereby a gas or gaseous fluid is obtained from a liquid in which it has entered into solution at a suitable pressure and temperature and from which it is effused by lowering the pressure or raising the temperature. This gaseous fluid after effusion is utilized for example in a prime mover for doing work, for useful warming purposes, or for refrigeration (the heat thus lost being reabsorbed from an exterior source), and the cycle completed by the gas reëntering into solution in the liquid from which it was effused. In such cycles the effusion of the gas has been caused by raising the temperature of the liquid in which the gas is in solution by exterior heat applied to the generator, the effused gas and liquid weakened by the effusion of gas being cooled and then delivered to an absorber chamber in which the gas reënters into solution in the liquid, which is then returned to the generator through a warming chamber, for example, by a pump. Provision has also been made for temperature transference between some of the chambers through which the liquid and gas are conducted, for example, from the absorber to the generator, and from the weak liquid cooling chamber to the warming chamber above mentioned through which liquid with gas in solution therein passes to the generator.

According to this invention, energy is taken from a source of natural or waste heat by means of a liquid and a gas soluble therein, which are conducted through a closed cycle of thermal operations, wherein effusion of gas from the liquid at one part of the cycle is effected solely by a direct transference of temperature from the liquid and gas at another part of the cycle where heat is evolved by the reëntrance of the gas into solution in the liquid. Moreover according to this invention, heat energy is taken into the liquid and gas, or either of them separately, only at a point in the cycle different from that where effusion of gas takes place, *i. e.*, different from that where the mean temperature of the cycle is the highest.

In one method according to my invention, the effused gas is caused to travel around a closed circuit and in this circuit a part of the heat of the effused gas is expended as work in a prime mover the said gas being subsequently re-calorified by passing it through a suitable chamber in which it is warmed by water or other calorifying fluid from a source exterior to the said closed circuit. This re-calorified gas is then returned into solution in the liquid from which it was originally effused within absorber and saturator coils or chambers arranged within effusion coils or chambers so that the thermal effects of solution and effusion may be exchanged or communicated directly between the fluids during these processes.

The degradation of pressure accompanying the conversion of heat into work in the prime mover can be conveniently restored by an appropriate utilization of part of the work derived from such conversion, leaving the remainder of the work available for use exterior to the closed cycle, and the amount of the work thus available is proportional to or a function of the amount of heat absorbed from the fluid by which the gas is re-calorified. The said invention provides an improved method for raising the temperature of one medium by lowering the temperature of a colder medium, by transference of temperature from hot weak liquid from which gas has been effused, to a medium exterior to the cycle.

In another method the effused gas is caused to travel around a closed circuit and after doing work in a prime mover is returned into solution during temperature degradation, while the thermal effects of effusion and solution are exchanged. The fluid is then re-calorified by heat from a source exterior to the closed circuit, to make up for the expenditure of heat as work in the prime mover, by water or other calorifying fluid passing through the region where the liquid is coolest, after solution of the gas therein.

The foregoing methods may be combined as found convenient.

Figure 2:
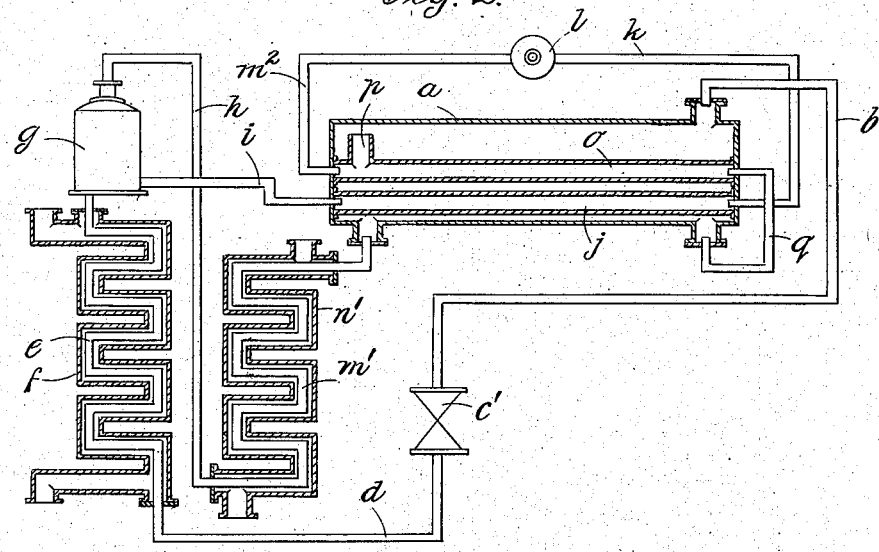

In the accompanying drawings:—Figure 1 is a diagram showing an installation operating according to this invention to convert heat energy into work. Fig. 2 is a similar diagram showing an installation arranged to operate alternatively as a heating or refrigerating system.

In the arrangement shown in Fig. 1, $a$ is a generator containing liquid with gas in solution therein, which does not completely fill the generator so that a space is provided in which the gas effused from said liquid can collect and from which this gas can be drawn off through a conduit $b$ under the control, if necessary, of a suitable valve or regulating device, and delivered to a working cylinder $c$ or like device capable of converting the energy stored in the gas in the form of heat and pressure, into useful work. The gas after doing work in the cylinder $c$ and thereby undergoing a degradation of both pressure and temperature, is conveyed through a conduit $d$, to a temperature exchanging device comprising a re-calorifying coil $e$ arranged in a conduit or chamber $f$. This conduit or chamber $f$ is traversed by a current of air, water, waste furnace gases, exhaust steam, or other source of heat by which the temperature of the gas in the coil $e$ is raised. The exchanging device, $e$, $f$, can be arranged to operate in steps or stages in the lower of which brine or equivalent liquid may be used as the heat source, in those cases where the degradation of the temperature of the gas in passing through the cylinder is sufficient to bring about the formation of snow. The re-calorified gas then passes to a controlling device $g$ to which weak liquid from the generator $a$ is also conducted separately, as hereinafter described, by a pipe $h$. The device $g$ automatically or otherwise controls the proportions of gas and weak liquid delivered through the conduit $i$ to an absorber chamber $j$, which may be a coil, wholly or partly immersed in the liquid in which a primary return into solution of the gas is carried on. This chamber $j$ is arranged within the generator $a$ and the sensible heat evolved by re-entrance of the gas into solution is thus made available for raising the temperature of the liquid in the generator $a$ to cause further effusion of gas from this liquid.

The degree of partial saturation of the effluent from the absorber $j$ due to this primary return of the gas into solution, is that corresponding to the pressure of the exhaust gas from the working cylinder $c$. This effluent is led by the pipe $k$ to a pump $l$, or other equivalent pressure raising device, by which it is raised to the pressure of the fluid in the generator $a$. On the suction or delivery side of the pressure raising device $l$, as may be convenient (shown on the delivery side in Fig. 1) the liquid after this primary return of gas into solution therein, passes through the inner conduit $m$ of a temperature exchanging device whose outer conduit $n$ conducts hot weak liquid from the generator $a$ to the pipe $h$ above mentioned. The exchange of heat here taking place lowers the temperature of the hot weak liquid as required precedent to and in order to promote the primary return of the gas into solution, and raises the temperature of the partially saturated liquid flowing through the conduit $m$. From the conduit $m$ the liquid passes into the saturator chamber $o$ which may be a coil, and which is wholly or partly immersed in the liquid in the generator, and which is also open at $p$ to receive gas from the upper part of the generator $a$. This chamber $o$ in which the process of returning the gas into solution is completed, is arranged within the generator $a$ like the chamber $j$ so that the sensible heat, evolved by the completion of solution promotes effusion of gas from the liquid therein. The completely saturated liquid passes from the chamber $o$ into the generator through the conduit $q$.

The flow of the liquid through the generator $a$ from the inlet conduit $q$ to the outlet into the conduit $n$ is in the opposite direction to the flow through the absorber $j$ and saturator $o$. Thus the liquid in the generator adjacent to the outlet to the conduit $n$ and adjacent to the parts where the separate stages of solution of the gas begin within the absorber and saturator, is at a higher temperature than the liquid entering the generator from the conduit $q$ where the stages of solution cease in the absorber and saturator. Also by reason of the effusion of gas within the generator the liquid at the liquid outlet end of the generator is weaker as well as hotter, by reason of the heat evolved in the absorber and saturator and transferred to the liquid in the generator, than the liquid entering the generator from the conduit $q$. The liquid and the effused gas thus move in closed overlapping circuits without any of the circulating media leaving the system, and heat energy for example from natural sources such as air and water at normal temperatures, or from other sources, exterior to the circuits is absorbed into the gas which is at a lower temperature, as this gas passes through the temperature exchanging device $e$, $f$, the operation of the cycle raising this heat energy to a thermal state conveniently permitting its conversion into work utilizable outside of the circuits.

By way of example, the generator may be charged with hydrous ammonia and ammonia gas under about seven atmospheres pressure at normal atmospheric temperature (for calorification by water say fifty seven degrees, Fahrenheit). If the circulatory system is adjusted to cool the water through about 7° F. (57° to 50°) while traversing the conduit or chamber $f$ from inlet to outlet (an intermediate temperature exchanger being provided to avoid formation of ice), from each pound (avoirdupois) of water about seven British thermal units would be absorbed by the gas traversing the conduit $e$ and become available for utilization as work in the cylinder $c$. Assuming the rate of flow of the cooled water to be one pound per second the heat energy absorbed by the gas would be equivalent to about ten horse power.

The arrangement described with reference to Fig. 1 in effect constitutes a refrigerating means wherein the temperature exchanging device $e$, $f$, is the cooling element, the heat abstracted by this means being translated into work through the cylinder $c$.

In a modified arrangement the re-calorifying medium raises the temperature of the liquid after gas has been returned into solution therein. In this case the conduit $d$ delivers directly into the controlling device $g$ and the temperature exchanging device $e$, $f$ is arranged between the pump $l$ and the heat exchanger $m$, $n$. The improved closed fluid cycle however may be employed as a heating or refrigerating means, as hereinafter described with reference to Fig. 2. In this case a generator $a$ delivers gas through $b$ to a pressure regulating valve $c'$, or like device permitting regulated expansion of the gas which then passes by a conduit $d$ to the temperature exchanging device $e$, $f$ operating to cool liquid passing through the conduit or chamber $f$. The liquid from the absorber $j$ passes from the pump $l$ directly through the pipe $m^2$ to the saturator $o$. The liquid from the generator to the pipe $h$ is conducted through the inner conduit $m'$ of a temperature exchanging device having its outer conduit $n'$ arranged to be traversed by liquid to be heated. It will be obvious that the hot weak liquid passing through the conduit $m'$ will impart heat to fluid passing through the conduit $n'$ and that the temperature exchanging device $m'$, $n'$, will thus become a warming element the thermal rise in which will depend on the degree of cooling undergone by the fluid flowing through the conduit $e$ of the temperature exchanging device $e$, $f$ which acts as a refrigerator.

The temperature difference of the water or other calorifying fluid at the inlet and outlet of the system need not be great, and the system may be worked by starting with normal temperatures and working to sub-normal temperatures or by starting from a raised temperature and working to a lower temperature either above, at, or below normal temperatures. Thus heat may be absorbed into the cycle from liquid flowing through the conduit $f$ and entering this conduit at a lower temperature than that of the liquid entering the conduit $n'$.

The amount of work done by the system is a function of the temperature difference of the water or other calorifying fluid entering the system and that leaving the system, and of the quantity of calorifying fluid used.

Any leakage of fluid in the prime mover or other part of the system is made good by additions as required.

The apparatus employed for carrying out said invention into practice has been referred to hereinabove only in general terms and indicated on the drawing diagrammatically since the constructional details of the same are not essential to the invention which is based upon the provision of means whereby gas effused from a liquid is re-calorified after undergoing thermal degradation, and whereby the increase of temperature occurring in the gas again entering into solution in the liquid is employed to promote effusion of the gas.

What I claim is:—

1. A method of taking energy from a source of heat by means of a liquid and a gas soluble therein conducted through a closed cycle of thermal operations, wherein effusion of gas from the liquid at one part of the cycle is effected solely by a direct transference of temperature from the liquid and gas at another part of the cycle where heat is evolved by the reëntrance of the gas into solution in the liquid.

2. A method of taking energy from a source of heat by means of a liquid and a gas soluble therein conducted through a closed cycle of thermal operations, wherein gas is effused from the liquid at one part of the cycle and heat energy from an exterior source is taken into the liquid and gas only at a part of the cycle different from that where effusion of gas takes place.

3. A method of taking energy from a source of heat by means of a liquid and a gas soluble therein conducted through a closed cycle of thermal operations, wherein gas effused from the liquid is cooled, recalorified by heat from a source exterior to the cycle, and returned into solution in weak liquid from which gas has been effused, and the heat evolved by reëntrance of the gas into solution is employed to cause effusion of gas.

4. A method of taking energy from a source of heat by means of a liquid and a gas soluble therein conducted through a closed cycle of thermal operations, wherein gas is effused from the liquid at one part of the cycle, the effused gas is expanded doing work, the expanded gas is recalorified by taking heat from the said source, the recalorified gas is returned into solution in the said liquid evolving heat at another part of the cycle, and this heat is transferred directly to the liquid and gas at the part of the cycle where effusion takes place.

5. A method of taking energy from a source of heat by means of a liquid and a gas soluble therein conducted through a closed cycle of thermal operations, wherein gas is effused from the liquid at one part of the cycle, the effused gas is cooled by expansion, the expanded gas is recalorified by heat received from a source exterior to the cycle, the liquid weakened by effusion of gas therefrom is cooled, the recalorified gas is returned into solution in the cooled liquid in stages at other parts of the cycle, and the heat evolved by this return of the gas into solution is employed to cause effusion of the gas from the liquid at the part of the cycle first-mentioned.

6. Apparatus for taking energy from a source of heat by means of a liquid and a gas soluble therein, comprising a generator, means for controlling expansion of the gas effused from the liquid, a recalorifier in which the expanded gas receives heat energy from the said source, a temperature exchanger in which liquid weakened by effusion of gas therefrom is cooled, and a chamber wherein the gas is returned into solution in the liquid, the said chamber being arranged within the generator.

CHARLES HYDE BEADLE.

Witnesses:
HERBERT ARTHUR BEESTON,
GEORGE DONALD HARRISON.